US00RE41015E

(19) United States
(12) Reissued Patent
Uno

(10) Patent Number: US RE41,015 E
(45) Date of Reissued Patent: Dec. 1, 2009

(54) BICYCLE BATTERY CHARGER AND SPEEDOMETER CIRCUIT

(75) Inventor: Kouji Uno, Osaka (JP)

(73) Assignee: Shimano, Inc., Sakai-ku, Sakai, Osaka Prefecture (JP)

(21) Appl. No.: 10/769,727

(22) Filed: Jan. 30, 2004

Related U.S. Patent Documents

Reissue of:
(64) Patent No.: 6,573,686
Issued: Jun. 3, 2003
Appl. No.: 10/100,936
Filed: Mar. 18, 2002

(30) Foreign Application Priority Data

Mar. 22, 2001 (JP) ..... 2001-083066

(51) Int. Cl.
*H02J 7/00* (2006.01)
*G05F 1/00* (2006.01)
*H05B 37/02* (2006.01)
*H05B 37/04* (2006.01)
*H05B 41/36* (2006.01)

(52) U.S. Cl. ..... 320/137; 315/291; 315/297; 315/293

(58) Field of Classification Search ..... 320/123, 320/128, 130, 163; 324/160, 163
See application file for complete search history.

(56) References Cited

U.S. PATENT DOCUMENTS

| | | | | | |
|---|---|---|---|---|---|
| 4,197,585 | A | * | 4/1980 | Moorey et al. | 702/149 |
| 5,910,714 | A | * | 6/1999 | Buchanan et al. | 318/139 |
| 6,290,014 | B1 | * | 9/2001 | MacCready, Jr. | 180/205 |
| 2003/0001357 | A1 | * | 1/2003 | Fujii et al. | 280/260 |

FOREIGN PATENT DOCUMENTS

| | | | |
|---|---|---|---|
| EP | 645868 A2 | | 3/1995 |
| JP | 6-261511 | * | 9/1994 |
| JP | 7-229909 | * | 8/1995 |
| JP | 8-337192 | * | 12/1996 |
| WO | WO 81/01274 A1 | | 5/1981 |
| WO | WO 81/012474 A1 | * | 5/1981 |

* cited by examiner

*Primary Examiner*—Akm Enayet Ullah
*Assistant Examiner*—Alexis Boateng
(74) *Attorney, Agent, or Firm*—James A. Deland

(57) ABSTRACT

A circuit that receives signals from a dynamo and provides signals for charging a battery and indicating bicycle speed. The circuit includes a first switching circuit adapted to receive the dynamo signals and provide first signals for charging the battery; and a second switching circuit adapted to receive the dynamo signals and provide second signals for indicating bicycle speed. If the dynamo outputs periodic signals, the first signals may correspond to one of the half periods of the periodic signals (e.g., the positive half periods), and the second signals may correspond to the other half periods (e.g., the negative half periods) of the periodic signals.

26 Claims, 3 Drawing Sheets

BICYCLE BATTERY CHARGER AND SPEEDOMETER CIRCUIT

Matter enclosed in heavy brackets [ ] appears in the original patent but forms no part of this reissue specification; matter printed in italics indicates the additions made by reissue.

BACKGROUND OF THE INVENTION

The present invention is directed to bicycles and, more particularly, to a circuit that receives signals from a dynamo and provides signals for charging a battery and indicating bicycle speed.

Bicycles often are equipped with dynamos for powering headlights and other types of lights. Contemporary bicycles, however, are equipped not only with such lights but also with actuators for operating electrically driven shifters, actuators for adjusting the dampening force of an electrically driven suspension, indicator backlights for cycle computers, and the like. Such equipment will be referred to below as "electrically driven units", and they also receive their power from the dynamo. These electrically driven units begin operating unstably when their electric drive voltage falls below a specific level, so some accommodation must be made for supplying stable electric drive voltage to them. In late-model bicycles, a dynamo charges a secondary battery which, in turn, powers the electrically driven units. Because stable electric drive voltage is needed to energize such electrically driven units in the above-described manner, the present inventor has already devised and proposed an apparatus that allows the charging voltage to be detected and a stabilized charging voltage to be obtained through appropriate switching of the dynamo output.

Speedometers are sometimes mounted on bicycles. Such speedometers operate with speed detection signals such as signals from a sensor that senses signals from a magnet mounted to the bicycle wheel. A technique for retrieving speed detection signals from a dynamo output is disclosed in JP (Kokai) 7-229909. However, when the dynamo output is switched in a controlled manner in order to control the charging voltage, the voltage drop varies significantly because of the presence of a load resistance, an impedance or inductance in the dynamo, or the like. The switching also induces substantial disruptions in the output waveform of the dynamo. Low-pass filters and other circuits are needed in order to obtain a speed detection signal from a signal whose waveform is markedly disrupted in this manner, thus increasing the size and cost of the device.

SUMMARY OF THE INVENTION

The present invention is directed to a comparatively simple circuit that receives signals from a dynamo and provides stable signals for charging a battery and indicating bicycle speed. In one embodiment of the present invention, such a circuit includes a first switching circuit adapted to receive the dynamo signals and provide first signals for charging the battery; and a second switching circuit adapted to receive the dynamo signals and provide second signals for indicating bicycle speed. In a more specific embodiment adapted for use with a dynamo that outputs periodic signals, the first signals may correspond to one of the half periods of the periodic signals (e.g., the positive half periods), and the second signals may correspond to the other half periods (e.g., the negative half periods) of the periodic signals. This may be accomplished using diode elements in the first and second switching circuits. A third switching circuit may be provided for selectively inhibiting the output of the first signals to the battery until the circuit is sufficiently stable, and a pulse signal circuit may be provided for producing pulse signals from the second signals to facilitate the operation of the speedometer.

DETAILED DESCRIPTION OF THE EMBODIMENTS

Figure 1:
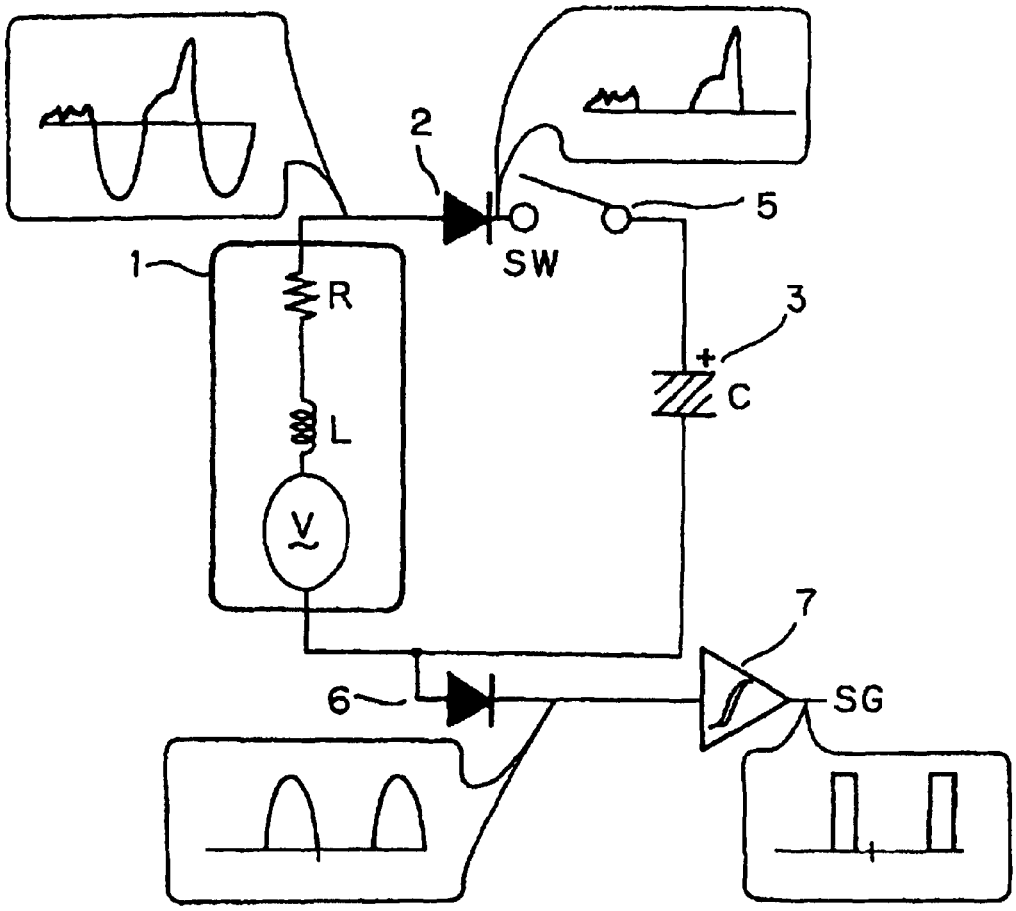
FIG. 1 is a conceptual schematic diagram of a particular embodiment of a battery charging and speed indicating circuit according to the present invention.

FIG. 1 is a conceptual schematic diagram of a particular embodiment of a battery charging and speed indicating circuit according to the present invention. The circuit comprises a dynamo 1 (generator), a first rectifying circuit 2 (first switching circuit), a second rectifying circuit 6 (second switching circuit), a secondary battery 3 (e.g., a capacitor) as a power supply for electrically driven units, and a switch 5 (third switching circuit) disposed between the dynamo 1 and the secondary battery 3. The circuit further comprises and a Schmitt circuit 7 coupled to the second rectifying circuit 6 for waveform shaping.

The dynamo 1 may, for example, be a hub dynamo built into the hub of the bicycle front wheel, and it is provided with an internal impedance R and an internal inductance L. The rectifying circuit 2 contains diodes or the like to rectify the alternating-current voltage output by the dynamo 1 and to provide the secondary battery 3 with the resulting positive or negative (e.g., positive) half-periods. The switch 5 contains capacitors, transistors or the like for selectively inhibiting the communication of the signals from rectifying circuit 2 to battery 3. The second rectifying circuit 6 contains diodes or the like to rectify the alternating-current voltage output by the dynamo 1 and to provide the speedometer circuit (not shown) with the resulting positive or negative (e.g., negative) half-periods as a speed detection signal. The Schmitt circuit 7 receives the output of the second rectifying circuit 6 and outputs a pulse signal such as the one shown in FIG. 1 to facilitate the operation of the speedometer, which usually comprises a microcomputer.

The signal waveforms of the various components of the circuit shown in FIG. 1 will now be described. The switch 5 is open or closed in accordance with the charging voltage of the secondary battery 3. The switching operation causes the load resistance to change abruptly, thus markedly varying the voltage drop due to the effect of the internal impedance R or internal inductance L of the dynamo 1. The dynamo output waveform is thereby disrupted violently as shown in FIG. 1. In this case, the output waveform is disrupted only during the positive half-periods because charging occurs only during these half-periods. In conventional devices a low-pass filter or other circuit is needed to derive a speed detection signal from such a disrupted output waveform. In view of this, the present embodiment is configured such that the second rectifying circuit 6 retrieves the negative half-periods of the output provided by the dynamo 1, and the signal waveform is shaped to provide a pulse signal for speed detection. As shown in FIG. 1, the speed detection signal can be readily formed without waveform disruption.

Figure 2:
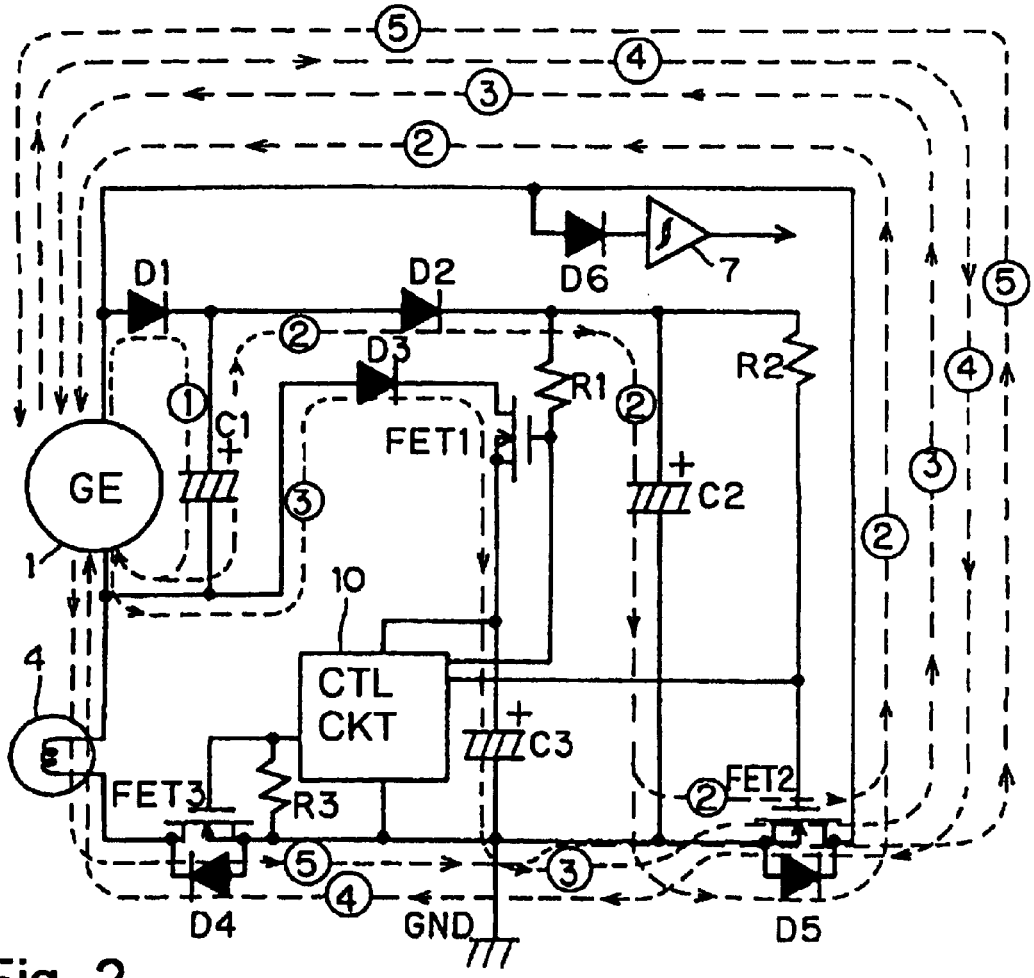
FIG. 2 is a detailed schematic diagram of the circuit shown in FIG. 1.

FIG. 2 is a detailed schematic diagram of the circuit shown in FIG. 1. In the circuit shown in FIG. 2, the positive and negative parts of the waveforms output by the dynamo 1 are the opposite of those produced by the circuit shown in FIG. 1.

As shown in FIG. 2, dynamo 1 is coupled with a first capacitor C1, a second capacitor C2, a first diode D1, and a second diode D2. In this circuit, the first and second capacitors C1, C2 and the first and second diodes D1, D2 constitute a voltage-doubling rectifier circuit. The first capacitor C1 is charged during the positive half-cycle of dynamo 1 output, and during the subsequent negative half-cycle the second capacitor C2 is charged with voltage equal to the voltage generated by dynamo 1 plus the charged voltage of the first capacitor C1. Thus, the second capacitor C2 can acquire high charged voltage at low speed. The second capacitor C2 functions as a power supply for driving first and third field-effect transistors FET1 and FET3, described later.

A third diode D3 serving as a rectifier circuit is coupled with dynamo 1, and the output of this third diode D3 is coupled, via the first field-effect transistor (hereinafter simply "transistor") FET1, to a third capacitor C3 serving as a rechargeable battery. The gate of first transistor FET1 is coupled, via a first resistor R1, to the second capacitor C2. In this circuit, the third diode D3 allows the third capacitor C3 to be charged, via first transistor FET1, with the output of dynamo 1 only during the negative half-cycle thereof. As is well known for such transistors, if the potential at the gate of first transistor FET1 is higher than that at the source by more than a predetermined level (2 V, for example), first transistor FET1 switches on. Since the voltage of the second capacitor C2 is applied to the gate of the first transistor FET1, the applied voltage is sufficiently high even under the low speed condition described earlier, the first transistor FET1 is stabilized in the ON state, and the third capacitor C3 charging operation is stabilized.

The second transistor FET2, third transistor FET3 (corresponding to switch 5 in FIG. 1) and lamp 4 are connected in series to dynamo 1. Diode D5, shown connected in parallel with second transistor FET2, and diode D4, shown connected in parallel with third transistor FET3, are parasitic diodes for the respective transistors FET2, FET3. The gate of the second transistor FET2 is coupled via a second resistor R2 to the second capacitor C2, and the gate of the third transistor FET3 is coupled to a control circuit 10. A third resistor R3 is also connected in parallel with the gate of third transistor FET3.

With this circuit arrangement, the gate potential of the first transistor FET1 can be controlled by control circuit 10 to control charging of the third capacitor C3, and the gate potential of the third transistor FET3 can be controlled according to the charged voltage of the third capacitor C3 to control on/off operation of the third transistor FET3. By switching off the second transistor FET2 together with the third transistor FET3, the lamp 4 can be extinguished completely.

Diode D6 is connected to the output of dynamo 1 to rectify the alternating-current voltage output by the dynamo 1 and to output the positive half-periods of the dynamo signals. The Schmitt circuit 7 receives the output of diode D6 and outputs a pulse signal such as the one shown in FIG. 1 as a speed detection signal to facilitate the operation of the speedometer, which usually comprises a microcomputer (not shown). Thus, the speed detection signal is produced from the positive half-periods of the generator output.

The operation of the circuit will now be described. It is assumed that all capacitors are initially empty. First, during the positive half-cycle of the output of dynamo 1, current flows over path (1):

(1): dynamo→D1→C1→dynamo

This results in charging the first capacitor C1. The voltage across the first capacitor C1 reaches approximately the dynamo output peak voltage of 0.6 V.

During the subsequent negative half-cycle current flows in reverse over path (2):

(2):dynamo→C1→D2→C2→D5→dynamo

This results in charging the second capacitor C2. The current supplied to the second capacitor C2 is equal to the current from dynamo 1 plus current from the charged first capacitor C1. Thus, the second capacitor C2 can be charged adequately even at low speed. When the voltage across the second capacitor C2 reaches {(voltage across C3)+(ON trigger voltage for gate of FET1)}, the first transistor FET1 turns on. The second transistor FET2 turns on as well. Thus, current now flows also over path (3):

(3): dynamo→D3ΘFET1→C3→FET2→dynamo

This initiates charging of the third capacitor C3. With this arrangement, the third capacitor C3 can be stably charged to relatively high voltage during the negative half-cycle of dynamo output only. Furthermore, as the voltage applied to the gate of the first transistor FET1 can be stabilized by the second capacitor C2, the ON state of the first transistor FET1 can be stabilized.

At this time the voltage across the third capacitor C3 is not adequate for driving other electrically powered units in a stable manner. Thus, the voltage applied to the gate of the third transistor FET3 is controlled by the control circuit 10 so that the third transistor FET3 remains off. During the positive half-cycle, the first capacitor C1 is charged by means of current flowing over path (1):

(1): dynamo→D1→C1→dynamo as described above, and the lamp 4 is lit by means of current flowing over path (4):

(4): dynamo→FET2→D4→lamp→dynamo.

During the subsequent negative half-cycle, the second capacitor C2 and third capacitor C3 are charged by means of current flowing over path (2):

(2): dynamo→C1→D2→C2→FET2→dynamo and current flowing over path (3):

(3): dynamo→D3→FET1→C3→FET2→dynamo.

The above operation by means of current flowing over paths (1) and (4) during the positive half-cycle of dynamo output and operation by means of current flowing over paths (2) and (3) during the negative half-cycle, are performed repeatedly.

When electric current flows along paths (1) and (4), the dynamo output of positive half-periods is extracted by the diode D6, and the waveform is shaped by the Schmitt circuit 7. The pulse signal generated by the Schmitt circuit 7 is used as a speed detection signal. During positive half-periods, the load varies only slightly because it consists of the lamp 4 alone. Thus, a speed detection signal can be provided during those positive half-periods in a simple and accurate manner.

Figures 3A, 3B:
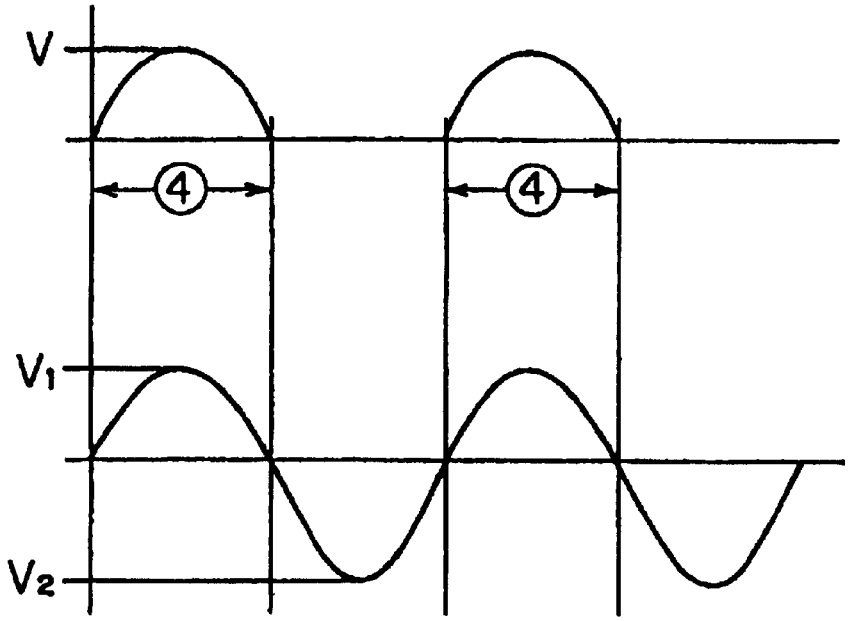
FIGS. 3(A) and 3(B) are diagrams of waveforms output by the second switching circuit and the dynamo, respectively.

FIG. 3(b) shows the waveform of dynamo output in this case, and FIG. 3(a) shows the waveform of the diode D6 (which is also the waveform of the voltage applied to the lamp 4). As will be apparent from the drawings, the lamp 4 is lit during the positive half-cycle of dynamo output, while the rechargeable battery (capacitor C3) is charged during the negative half-cycle. In FIG. 3(b), the positive peak voltage V1 is lower than the negative peak voltage V2; this is due to a drop in voltage in the dynamo resulting from the lamp load. The third capacitor C3 is repeatedly recharged in this manner, and when the voltage across the third capacitor C3 reaches a level sufficient to drive other devices, the third transistor FET3 is turned on by the control circuit 10. This causes current to flow over path(5);

(5) dynamo→lamp→FET3→FET2→dynamo so that the lamp lights. In this state the lamp is lit not intermittently, but continuously during both the positive and negative half-cycles of dynamo output. The lamp 4 can be extinguished completely by switching off the second transistor FET2 in addition to the third transistor FET3.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A circuit that receives *periodic* signals from [a] *an alternating current* dynamo and provides signals for charging a battery and indicating bicycle speed, wherein the circuit comprises:

a first switching circuit adapted to receive the dynamo signals and provide first signals for charging the battery; [and]

a second switching circuit adapted to receive the dynamo signals and provide second signals for indicating bicycle speed*; and*

*a third switching circuit that selectively inhibits the output of the first signals to the battery*.

2. The circuit according to claim 1 further comprising a pulse signal circuit for providing pulse signals from the second signals.

3. The circuit according to claim 2 wherein the pulse signal circuit comprises a Schmitt circuit.

[4. The circuit according to claim 1 further comprising a third switching circuit that selectively inhibits the output of the first signals to the battery.]

5. The circuit according to claim [4] *1* wherein the third switching circuit comprises a transistor.

6. The circuit according to claim 1 wherein the first switching circuit comprises a first diode element, and wherein the second switching circuit comprises a second diode element.

7. [The circuit according to claim 1 wherein the dynamo signals are periodic signals,] *A circuit that receives periodic signals from an alternating current dynamo and provides signals for charging a battery and indicating bicycle speed, wherein the circuit comprises:*

*a first switching circuit adapted to receive the dynamo signals and provide first signals for charging the battery; and*

*a second switching circuit adapted to receive the dynamo signals and provide second signals for indicating bicycle speed;*

*wherein a second signal is not provided at a same time as a first signal is provided; and* wherein the first signals correspond to one of the half periods of the periodic signals, and wherein the second signals correspond to the other half periods of the periodic signals.

8. The circuit according to claim [2] *7* wherein the first signals correspond to positive half periods of the periodic signals, and wherein the second signals correspond to negative half periods of the periodic signals.

9. The circuit according to claim 7 wherein the first switching circuit comprises a first diode element, and wherein the second switching circuit comprises a second diode element.

10. The circuit according to claim 9 further comprising a pulse signal circuit for providing pulse signals from the second signals.

11. The circuit according to claim 10 wherein the pulse signal circuit comprises a Schmitt circuit.

12. The circuit according to claim 11 further comprising a third switching circuit that selectively inhibits the output of the first signals to the battery.

13. The circuit according to claim 12 wherein the third switching circuit comprises a transistor.

14. The circuit according to claim 13 wherein the first signals correspond to positive half periods of the periodic signals, and wherein the second signals correspond to negative half periods of the periodic signals.

*15. The circuit according to claim 1 further comprising a power supply charged by the dynamo for controlling operation of the third switching circuit.*

*16. The circuit according to claim 15 wherein the power supply comprises a capacitor.*

*17. The circuit according to claim 7 further comprising a pulse signal circuit for providing pulse signals from the second signals.*

*18. The circuit according to claim 17 wherein the pulse signal circuit comprises a Schmitt circuit.*

*19. The circuit according to claim 7 further comprising a third switching circuit that selectively inhibits the output of the first signals to the battery.*

*20. The circuit according to claim 19 wherein the third switching circuit comprises a transistor.*

*21. The circuit according to claim 19 further comprising a power supply charged by the dynamo for controlling operation of the third switching circuit.*

*22. The circuit according to claim 21 wherein the power supply comprises a capacitor.*

*23. The circuit according to claim 22 wherein the third switching circuit comprises a transistor.*

*24. The circuit according to claim 7 wherein the first switching circuit comprises a first diode element, and wherein the second switching circuit comprises a second diode element.*

*25. The circuit according to claim 7 wherein the first signals consist essentially of one of the half periods of the periodic signals, and wherein the second signals consist essentially of the other half periods of the periodic signals.*

*26. The circuit according to claim 7 wherein the first signals are mutually exclusive from the second signals.*

*27. The circuit according to claim 7 wherein a polarity of the first signals is opposite a polarity of the second signals.*

* * * * *